United States Patent
Chiou et al.

(10) Patent No.: US 11,259,147 B2
(45) Date of Patent: Feb. 22, 2022

(54) SERVER, COMMUNICATION SYSTEM, AND POSITIONING METHOD BASED ON MOBILE NETWORK THEREOF

(71) Applicant: Groundhog Inc., Taipei (TW)

(72) Inventors: Ta-Gang Chiou, Taipei (TW); I-Hung Lin, Taipei (TW)

(73) Assignee: Groundhog Inc., Taipei (TW)

( * ) Notice: Subject to any disclaimer, the term of this patent is extended or adjusted under 35 U.S.C. 154(b) by 77 days.

(21) Appl. No.: 16/866,537

(22) Filed: May 4, 2020

(65) Prior Publication Data
US 2020/0267510 A1   Aug. 20, 2020

Related U.S. Application Data

(63) Continuation-in-part of application No. 16/520,301, filed on Jul. 23, 2019.
(Continued)

(51) Int. Cl.
*H04W 4/029* (2018.01)
*H04W 24/10* (2009.01)
(Continued)

(52) U.S. Cl.
CPC ........... *H04W 4/029* (2018.02); *G01S 19/40* (2013.01); *G01S 19/421* (2013.01); *H04B 17/318* (2015.01); *H04W 24/10* (2013.01)

(58) Field of Classification Search
CPC ......... H04W 4/00; H04W 24/00; G01S 19/00; H04B 17/00
See application file for complete search history.

(56) References Cited

U.S. PATENT DOCUMENTS 9,820,255 B1 *   11/2017   Demsey ............... H04W 12/10
2003/0125046 A1   7/2003   Riley et al.
(Continued)

FOREIGN PATENT DOCUMENTS

CN   101398976   6/2011
CN   103018711   10/2014
(Continued)

OTHER PUBLICATIONS

"Search Report of Europe Counterpart Application", dated Apr. 15, 2021, p. 1-p. 14.
(Continued)

*Primary Examiner* — Jung H Park
*Assistant Examiner* — Sumitra Ganguly
(74) *Attorney, Agent, or Firm* — JCIPRNET

(57) ABSTRACT

A server, a communication system, and a positioning method based on mobile network thereof are provided. In the method, a first measurement report and a second measurement report are received. The first measurement report is related to a first network performance measurement of a user equipment (UE) with a mobile network and includes first location information of the UE, and the second measurement report is related to a second network performance measurement of the UE with the mobile network. The Second location information of the UE is determined according to a monitoring result obtained from the second measurement report. The monitoring result is related to the signal transmission condition of the UE in the mobile network. The second location information is calibrated according to the first location information. Accordingly, the accuracy of the location of the UE may be improved.

17 Claims, 3 Drawing Sheets

Related U.S. Application Data

(60) Provisional application No. 62/770,757, filed on Nov. 22, 2018.

(51) Int. Cl.
   *G01S 19/42* (2010.01)
   *G01S 19/40* (2010.01)
   *H04B 17/318* (2015.01)

(56) References Cited

U.S. PATENT DOCUMENTS

2004/0266457 A1    12/2004   Dupray
2012/0135729 A1*   5/2012   Chiou .................. H04W 24/10
                                                      455/434
2020/0105120 A1*   4/2020   Werner .............. G08B 13/1672

FOREIGN PATENT DOCUMENTS

EP         2640116         9/2013
EP         2640116 A1 *   9/2013   ............ H04W 64/00
WO       2015135478      9/2015
WO       2015197537     12/2015

OTHER PUBLICATIONS

"Office Action of Taiwan Counterpart Application", dated Sep. 17, 2021, p. 1-p. 10.

\* cited by examiner

SERVER, COMMUNICATION SYSTEM, AND POSITIONING METHOD BASED ON MOBILE NETWORK THEREOF

CROSS-REFERENCE TO RELATED APPLICATION

This application is a continuation-in-part application of and claims the priority benefit of U.S. application Ser. No. 16/520,301, filed on Jul. 23, 2019, now pending, which claims the priority benefit of U.S. provisional application Ser. No. 62/770,757, filed on Nov. 22, 2018. The entirety of each of the above-mentioned patent applications is hereby incorporated by reference herein and made a part of this specification.

BACKGROUND OF THE DISCLOSURE

1. Field of the Disclosure

The present disclosure generally relates to a positioning method, in particular, to a server, a communication system, and a positioning method based on mobile network thereof.

2. Description of Related Art

Nowadays, almost everyone has an Internet connectable device (such as mobile phone, tablet, laptop, etc.), and the device may connect to the Internet through mobile networks (i.e., mobile networks). There are many mobile network operators (MNOs) in each country. MNO would always like to understand its competitors' network performance (coverage in terms of signal strength and signal quality) to evaluate its competitiveness. The conventional way is to use a mobile phone equipped with the SIM card relating to different MNOs when performing drive test.

Geolocation methodology can reduce drive test by using Measurement Reports in the OSS call trace. With specific procedures as claimed in our previous application, it can support to monitor the network performance of competitor MNOs.

SUMMARY OF THE DISCLOSURE

Accordingly, the present disclosure is directed to a server, a communication system, and a positioning method based on the mobile network thereof, and the positioning result based on the mobile network would be corrected with satellite positioning system.

In one of the exemplary embodiments, a server includes, but not limited to, a communication transceiver and a processor. The communication transceiver is used for transmitting and receiving signals. The processor is coupled to the communication transceiver. The processor is configured to receive a first measurement report through the communication transceiver, receive a second measurement report through the communication transceiver, determine second location information of a user equipment (UE) according to a monitoring result obtained from the second measurement report, and calibrate the second location information according to the first location information. The first measurement report is related to a first network performance measurement of the UE with at least one mobile network, and the first measurement report includes the first location information of the UE. The second measurement report is related to a second network performance measurement of the UE with the mobile network. The monitoring result is related to the signal transmission condition of the UE in the one mobile network.

In one of the exemplary embodiments, a positioning method based on mobile network includes, but not limited to, the following steps. A first measurement report is received. The first measurement report is related to a first network performance measurement of a UE with at least one mobile network, and the first measurement report includes the first location information of the UE. A second measurement report is received. The second measurement report is related to a second network performance measurement of the UE with the at least one mobile network. The second location information of the UE is determined according to a monitoring result obtained from the second measurement report. The monitoring result is related to the signal transmission condition of the UE in the mobile network. The second location information is calibrated according to the first location information.

In one of the exemplary embodiments, a communication system includes, but not limited to, a UE and a server. The UE transmits a first measurement report and transmits a second measurement report. The first measurement report is related to a first network performance measurement of a UE with one or more mobile networks, and the first measurement report includes the first location information of the UE. The second measurement report is related to a second network performance measurement of the UE with the mobile network. The server determines the second location information of the UE according to a monitoring result obtained from the second measurement report and calibrates the second location information according to the first location information. The monitoring result is related to the signal transmission condition of the UE in the mobile network.

In light of the foregoing, according to the server, the communication system, and the positioning method based on mobile network thereof provided in one or more embodiments, the first location information included in the first measurement report would be used for calibrating the second location information which is estimated based on the monitoring result of the signal transmission condition. Accordingly, the positioning accuracy of the second location information may be improved, so as to further provide more reliable network performance measurement. In addition, it provides an easier way to improve the accuracy of the positioning, so as to enhance the reliability of the network performance measurement.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
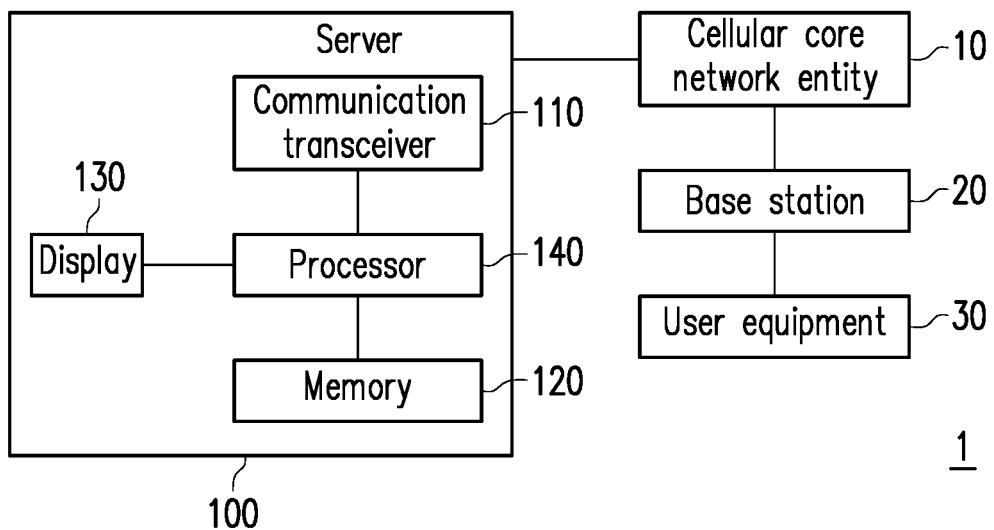
FIG. 1 is a schematic diagram of a communication system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of a communication system 1 according to one of the exemplary embodiments of the disclosure. Referring to FIG. 1, the communication system 1 includes, but not limited to, one or more cellular core network entities 10, one or more base stations (BSs) 20, one or more user equipments (UEs) 30, and a server 100. It should be noticed that the numbers of the cellular core network entities 10, the BSs 20, and the UEs 30 may be determined based on actual situation.

The cellular core network entity 10, the BS 20, and the UE 30 are in one mobile network of one mobile network operator (MNO). The mobile network may be global system for mobile communications (GSM)/general packet radio service (GPRS)/enhanced data rates for GSM evolution (EDGE) (i.e., second generation (2G) mobile network), code division multiple access (CDMA) 2000/evolution-data optimized (EVDO), universal mobile telecommunications system (UMTS)/high speed packet access (HSPA) (i.e., 3G mobile network), long term evolution (LTE), (long term evolution-advanced) LTE-A (i.e., 4G mobile network), 5G New Radio or further generation mobile networks.

For different generations of the mobile network, the cellular core network entity 10 and the BS 20 could be different. For example, regarding 3G and 4G networks, the cellular core network entity 10 could be a home subscribe server (HSS), or a mobility management entity (MME), and the BS 20 could be a home evolved node B (HeNB), eNB, an advanced base station (ABS), or a base transceiver system (BTS). Regarding for 5G network, the cellular core network entity 10 could be an authentication server function (AUSF), or an access and mobility management function (AMF), and the BS 20 could be gNodeB (gNB). Alternatively, the cellular core network entity 10 could be any sever in the core network. In the embodiment of the disclosure, the cellular core network entity 10 may further operates an operation support system (OSS), a business support (BSS), or other operations, administration and maintenance (OAM) related platforms of the mobile network.

The UE 30 may have multiple implementations, for example, (but is not limited to) a mobile station, an advanced mobile station (AMS), a telephone device, a customer premise equipment (CPE), a wireless sensor, etc. In one embodiment, the UE 30 may be equipped with one or more physical subscriber smart cards (such as a subscriber identity module (SIM), a removable user identity module (RUIM), a universal integrated circuit card (UICC), etc.) or embedded SIM (eSIM), which is/are allowed to register to it own subscribed mobile network(s) but not allowed to register to the other mobile networks (i.e., non-subscribed mobile networks) except for roaming.

The server 100 may be a desktop computer, a laptop, a smartphone, a tablet, a network host, or any computing device. In some embodiments, the server 100 may be one of the cellular core network entity 10. The server 100 may include, but not limited to, a communication transceiver 110, a memory 120, a display 130, and a processor 140.

The communication transceiver 110 could be a communication interface (such as universal serial bus (USB), universal asynchronous receiver/transmitter (UART), RJ45, etc.) or a wireless transceiver (such as UMTS, LTE, 5G New Radio, Wi-Fi, Bluetooth, etc.). The communication transceiver 110 is used to transmit/receive signals to/from the cellular core network entity 10.

The memory 120 could be any type of a fixed or movable random access memory (RAM), a read-only memory (ROM), a flash memory or a similar device or a combination of the above devices. The memory 120 records program codes, network configurations, frequency spectrum information, measurement reports, location information, codebooks, buffer data or permanent data, which would be introduced later.

The display 130 could be liquid-crystal display (LCD), light-emitting diode (LED), organic light-emitting diode (OLED), or other displays.

The processor 140 is coupled to the communication transceiver 110, the memory 120 and the display 130. The processor 140 is configured to process digital signals, executes a procedure of the exemplary embodiment of the disclosure, and is adapted to access or load the data and software modules recorded by the memory 120. Functions of the processor 140 may be implemented by using a programmable unit such as a central processing unit (CPU), a microprocessor, a microcontroller, a digital signal processing (DSP) chip, a field programmable gate array (FPGA), etc. The functions of the processor 140 may also be implemented by an independent electronic device or an integrated circuit (IC), and operations of the processor 140 may also be implemented by software.

In the embodiment of the disclosure, the processor 140 may handle operations, administration, and maintenance (OAM) functions for the mobile network, such as 3G, 4G, 5G, or further generation. For example, the processor 140 can handle signaling and message of billing and operational support systems (BOSS)/operation support system (OSS) for 3G core network. The processor 140 may further establish communications through the communication transceiver 110 with the cellular core network entity 10 to transmit or receive data or message with each other.

In order to fully convey the spirit of the disclosure to those skilled in the art, several embodiments are provided below for further descriptions. In the following content, the method of the embodiment of the disclosure is described with reference of various devices in the communication system 1. Various steps of the method of the embodiment of the disclosure may be adjusted according to an actual implementation, and are not limited by the disclosure.

Figure 2:
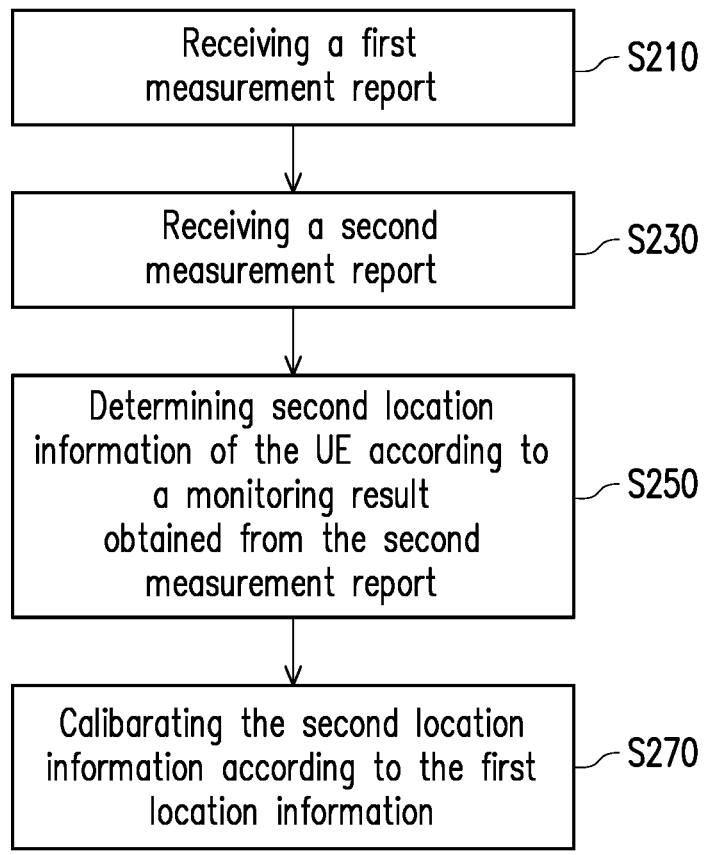
FIG. 2 is a flowchart illustrating a positioning method based on mobile network according to one of the exemplary embodiments of the disclosure.

FIG. 2 is a flowchart illustrating a positioning method based on mobile network according to one of the exemplary embodiments of the disclosure. Referring to FIG. 2, the processor 140 of the sever 100 may receive a first measurement report through the communication transceiver 110 (step S210). Specifically, the first measurement report is related to a network performance measurement of the UE 30 with one or more mobile networks. The network performance measurement could be a measurement report process, which is used to measure signal strength, signal quality, signal to noise/interference ratio, etc. For example, reference signal received power (RSRP), reference signal received quality (RSRQ), and signal-to-interference-plus-noise ratio (SINR) with corresponding cell's physical cell identity (PCI) are reported in the measurement report for given reference signal with a specific carrier frequency. Besides the monitoring results (such as RSRP, RSRQ, etc.) directly from measurement report, the combination of the monitoring results may be converted into other results by using any form of formula. For example, the received signal strength indication (RSSI) can be derived by RSRP and RSRQ. In addition, the processor 140 may take the RSRP/RSRQ into a formula to generate new results for other network quality indicators. The UE 30 may scan all frequency spectrums listed in the frequency spectrum information, which is requested by BS 20, to obtain corresponding monitoring result. It should be noticed that, the content of network performance measurement could be different for different generation mobile networks. In addition, the network performance measurement process can be either event-triggered or set as periodical. For example, in the case of event-triggered measurement, a threshold/offset would be configured properly in order to collect the required number of measurement reports. For another example, in the case of periodical measurement, the measurement report process may be performed according to one or more specific periods. After the first measurement report is transmitted by the UE 30, the server 100 may receive the first measurement report or the monitoring result from the first measurement report via the BS 20 and the cellular core network entity 10.

In one embodiment, the network performance measurement is the minimization of drive test (MDT) introduced in one release the third-generation partnership project (3GPP). In the mechanism of the MDT, an MNO may be able to configure the measurement report process of the UE 30 through network configuration, and the UE 30 will send measurement reports accordingly with latitude and longitude coordinates.

Figure 3A:
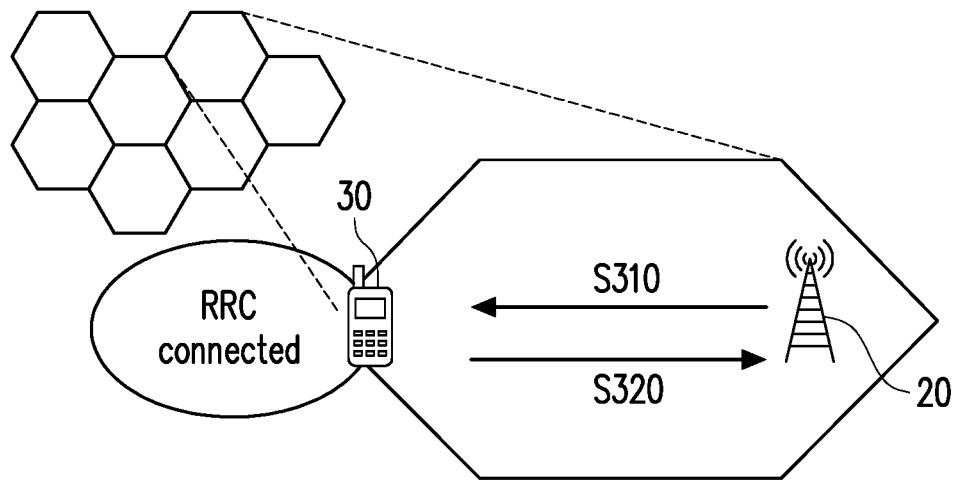
FIG. 3A is a schematic diagram illustrating the immediate minimization of drive test (MDT) according to one of the exemplary embodiments of the disclosure.

FIG. 3A is a schematic diagram illustrating the immediate MDT according to one of the exemplary embodiments of the disclosure. Referring to FIG. 3A, the BS 20 transmits a network configuration of MDT to the UE 30 (step S310), and the UE 30 may feedback measurement reports based on the network configuration (step 320). It should be noted that the immediate MDT involves measurement performance by UE in the CONNECTED state (such as radio resource control (RRC) CONNECTED state or another state that UE 30 may perform user data transmission with the BS 20) and reporting of the measurements to BS 20 available at the time of reporting condition (such as the period of the measurement report process).

Figure 3B:
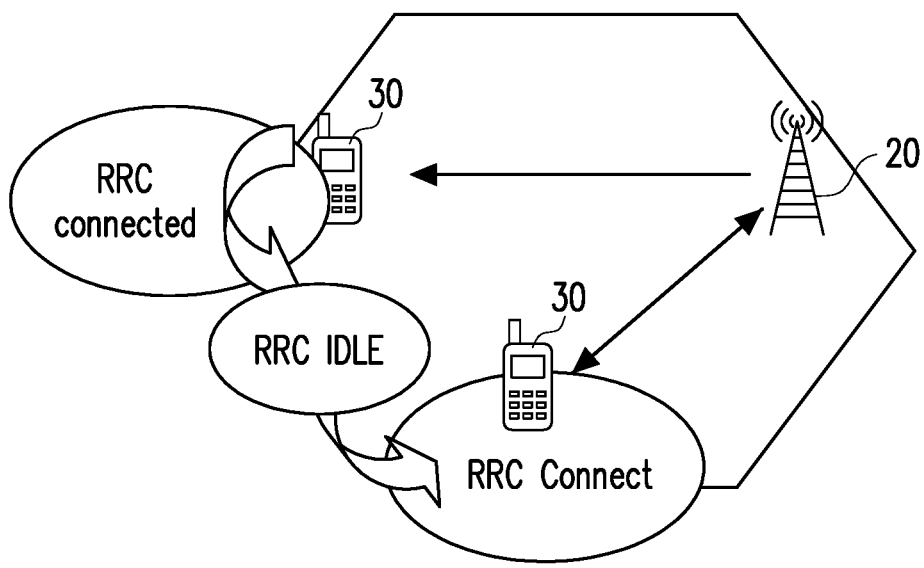
FIG. 3B is a schematic diagram illustrating the logged MDT according to one of the exemplary embodiments of the disclosure.

FIG. 3B is a schematic diagram illustrating the logged MDT according to one of the exemplary embodiments of the disclosure. Referring to FIG. 3B, the difference from the immediate MDT is that the logged MDT may involve measurement performance by the UE 30 in IDLE state (such as RRC IDLE state or another state that UE 30 may merely receive control signaling from the BS 20) at points in time when configured conditions (such as a specific event or a specific period) are satisfied, one or more measurement logs in the storage of UE 30 would be reported to the BS 20 at a later point when the UE 30 is operated in CONNECTED state.

It should be noted that the first measurement report may further include the first location information of the UE 30. In one embodiment, the first location information is obtained based on the satellite positioning operation of the UE 30. The satellite positioning operation may be operated based on global positioning system (GPS), Galileo satellite system, global navigation satellite system (GLONASS), BeiDou Navigation Satellite System, or other global navigation satellite system (GNSS). The first location information may be latitude and longitude coordinates or a relative location corresponding to one or more specific landmarks. The UE 30 may report the first measurement report which includes the first location information based on satellite positioning operation to the BS 20.

In one embodiment, the processor 140 may configure a network configuration of the first network performance measurement. It means that the network performance measurement may be requested by the server 100. In one embodiment, the network configuration may include a command to enable the satellite positioning operation of the UE 30, and the network configuration is used by the cellular core network entity 10. Therefore, the first location information could be obtained based on the satellite positioning operation of the UE 30. The network configuration may be an OSS/BSS configuration which can be configured in the cellular core network entity 10. For example, the processor 140 may configure OSS/BSS operated on the cellular core network entity 10 by using batch scripts, so as to transmit the network configuration through the communication transceiver 110. The batch scripts record commands can be implemented in the OSS/BSS according to network configuration. Then, the OSS/BSS operated on the cellular core network entity 10 would execute an instruction indicated in the network configuration towards BS 20. The instruction is, for example, to request the BS 20 to transmit control message (such as RRC messages) of the network performance measurement (such as MDT or other measurements). Taking the network configuration of immediate MDT as an example, in a RRC reconfiguration message, the trigger type could be periodical (i.e., a periodical measurement report process), the maximum report cells could be 4, the report interval could be 10 seconds, the reported amount could be 16, and the location information included indicator (e.g., the aforementioned command of satellite positioning operation) set as true. It should be noticed that the values in the example is merely used for exemplary description, and these values could be modified based on actual requirement. Then, the measurement report may include, for example, RSRPs corresponding to four BSs 20 with the GNSS coordinates of the UE 30.

Furthermore, to monitor the network performance of nearby mobile networks, such as competitors' and domestic roaming partners' networks in large spatial and temporal scale, by utilizing UE capabilities in line with 3GPP standard. One capability of the embodiment is the full spectrum scan or desired spectrum scan capability of the UE 30. The UE 30 is designed to scan a frequency spectrum including multiple carrier frequencies depending on its capability of the chipset. Although only the subscriber smart card or eSIM provided and activated by operator will allow the UE 30 to pass authorization process and register to its own mobile network (which corresponds to one frequency spectrum), the UE 30 may keep measuring the neighboring cells in specific carrier frequencies (which corresponds to other frequency spectrums) configured by OSS.

Figure 4:
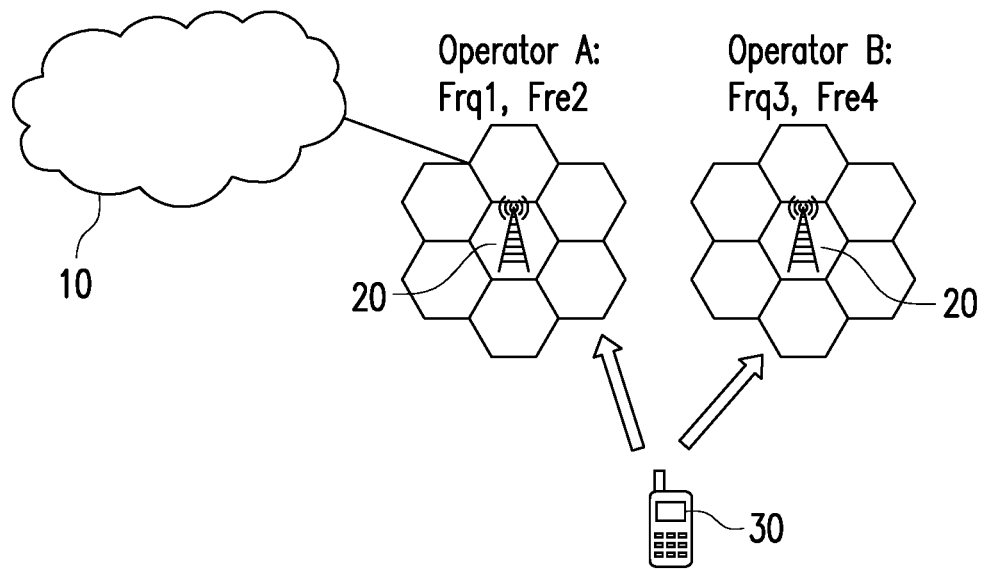
FIG. 4 is a schematic diagram illustrating frequency spectrum scanning according to one of the exemplary embodiments of the disclosure.

FIG. 4 is a schematic diagram illustrating frequency spectrum scanning according to one of the exemplary embodiments of the disclosure. Referring to FIG. 4, the operator A uses carrier frequencies Freq1 and Freq2 while operator B uses carrier frequencies Freq3 and Freq4. However, operator A can mandate the UE 30 of its subscriber to measure all carrier frequencies Freq1, Freq2, Freq3, and Freq4 by proper OSS configuration. In this way, the frequency bands Freq3 and Freq4 which belong to the operator B can be monitored and used for later analysis.

In one embodiment, the processor 140 may further configure the network configuration to include frequency spectrum information. The frequency spectrum information includes multiple frequency spectrums possessed by two or more mobile networks. The mobile networks include one mobile network of the communication system 1 and at least one other mobile network different from the mobile network of the communication system 1. The frequency spectrums of two mobile networks would be different. The carrier frequencies in the frequency spectrums of two mobile networks are not be overlapped. For example, a first frequency spectrum of one mobile network includes carrier frequencies 2110~2125 MHz and 1830~1850 MHz, and a second frequency spectrum of another mobile network includes carrier frequencies 2150~2170 MHz and 1820~1830 MHz. The frequency spectrum information would record a list of carrier frequencies and allowed bandwidth for each frequency spectrum. For example, the frequency spectrum information includes 1710~1725 MHz of carrier frequencies with 15 MHz bandwidth of one mobile network and 1725~1735 MHz of carrier frequencies with 10 MHz bandwidth of another mobile network. Then, the frequency spectrums of the network configuration would be scanned for the network performance measurement of the UE 30, and the frequency spectrum information may include frequency spectrum of competitor network.

It should be noted that the frequency spectrum could be one or more licensed frequency bands in a region or one or more supported frequency bands of the UE 30 (which may be conveyed by UE capability information).

The processor 140 of the server 100 may receive a second measurement report through the communication transceiver 110 (step S230). Specifically, the second measurement report is related to another network performance measurement of the UE with one or more mobile networks. The difference between the first and second measurement reports is that the second measurement report does not include the GNSS location information of UE 30. The network performance measurement corresponding to the second measurement report may be a normal measurement report process or an MDT without reporting GNSS location information. The network configuration may indicate that the UE 30 needs not or disables to report its GNSS capability in the second measurement report. Taking the network configuration of immediate MDT as an example, in a RRC reconfiguration message, the location information included indicator (e.g., the aforementioned command of satellite positioning operation) could be false. However, the network performance measurement, the other parameters of the network configuration, and the frequency spectrum information corresponding to the second measurement report may be the same or similar to the first measurement report, and the description thereof would be omitted.

Then, the processor 140 of the server 100 may calculate the second location information of the UE 30 according to a monitoring result obtained from the second measurement report (step S250). Specifically, there are several positioning algorithms including triangulation, tri-lateration, and TDOA (Time Difference Of Arrival), which can be applied to geo-locate the monitoring results (corresponding to the location of UE 30) collected in the OSS. The monitoring result is related to signal transmission condition (such as signal strength, channel quality, encoding manner, etc.) of the UE 30 in one or more mobile networks. For example, the monitoring results could be RSRP, RSRQ, etc. The signal strength of the monitoring result may be used for the triangulation, trilateration, or other positioning algorithms. For example, the server 100 builds in the actual geographical information (such as latitude and longitude, direction, tilt, and etc.) of three BSs 20 and multiple corresponding signal strengths of the UE 30 relative to the three BSs 20, and the server 100 may calculate the location information of the UE 30 by positioning algorithms. The second location information could be this geographical information.

In one embodiment, the processor 140 may correlate signal strengths of the monitoring result of the first measurement report corresponding one or more BSs 20 with the first location information, respectively, to generate location reference information. It is assumed the accuracy of first location information providing GNSS is better than the second location information. On the other hand, the signal strength is related to relative distance or relative location. The location reference information represents the signal strengths from one or more BSs 20 may be measured at the location recorded in the first location information. Then, the processor 140 may compare the monitoring result of the second measurement report with the location reference information to determine the second location information of the UE 30. For example, the processor 140 may search corresponding cell identity recorded in the second measurement report from the location reference information, and compare their RSSIs of the same cell identity between the second measurement report and the location reference information, so as to determine the second location information based on the compared result and the first location information.

Figure 5:
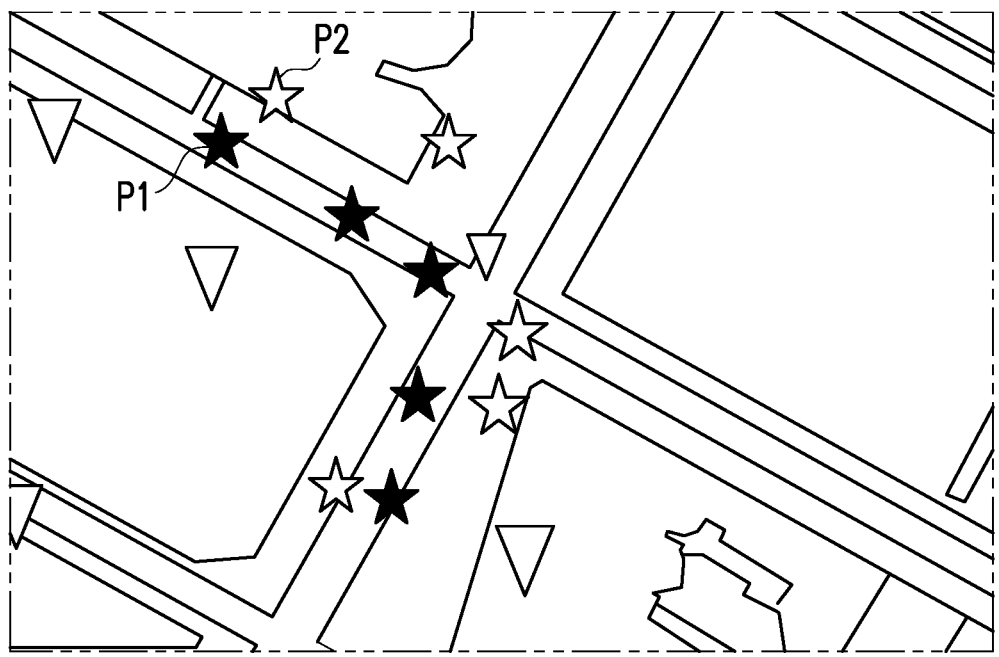
FIG. 5 is a schematic diagram illustrating location information of two measurement reports according to one of the exemplary embodiments of the disclosure.

Then, the processor 140 of the server 100 may calibrate the second location information according to the first location information (step S270). Specifically, in order to improve the accuracy of the second location information, and second location information should be modified based on a more accurate positioning mechanism. The satellite positioning mechanism is used in the embodiment. FIG. 5 is a schematic diagram illustrating location information of two measurement reports according to one of the exemplary embodiments of the disclosure. Referring to FIG. 5, the black star sign represents the first location information P1, and the white star sign represents the second location information P2. It is assumed that a user holds the UE 30 and walks on the roads. The trajectory of the UE 30 based on the first location information P1 may be located on the roads. However, the trajectory of the UE 30 based on the second location information P2 may not be located on the roads, so that the second location information P2 maybe not reliable.

It should be noted that the first and second measurement reports may be linked with the timestamps, which represents the time when the UE 30 performs the network performance measurement. In one embodiment, the processor 140 may compare time information between the first location information and the second location information of the UE 30 and use the first location information with matched time or closest time information to modify the second location information. The time information could be the aforementioned timestamp or other time indicator. If the times in the time information of the first and second measurement reports are the same, the processor 140 may replace the second location information with the corresponding first location information or use the weighted combination of the corresponding first and second location information as the modified second location information. Otherwise, the processor 140 may select one or more pieces of first location information having time information closer to the time information of the second location information. Then, the processor 140 may replace the second location information with the one piece of the selected first location information or use the weighted combination of the corresponding first and second location information as the modified second location information. Accordingly, the modified second location information may be more accurate.

After the second location information is corrected, the processor 150 may compare the monitoring results obtained from the first and second measurement reports of the mobile networks at locations corresponding to the first location information and corrected second location information. Location information can make the comparison more useful because measured performance in the same geographical area can be compared together. Therefore, how to associate collected competitor monitoring results with geographical information is an important part of the embodiment of the disclosure. On the basis of the first and calibrated second location information, by comparing the monitoring results (such as signal strength and signal quality) of two or more mobile networks at the same geographical location, MNO can compare the network performance for benchmark purposes. In addition, a graphical user interface (GUI) with the monitoring result may be further presented on the display 130.

In summary, the exemplary embodiments described above depicted the server, the communication system, and the positioning method based on the mobile network thereof. The satellite positioning mechanism is used in the network performance measurement of mobile networks. The positioning algorithm based on the monitoring result of the measurement report may be further calibrated according to the location information based on the satellite positioning mechanism. Additionally, Minimization of Drive Test (MDT) is introduced by 3GPP and available in network. It provides GNSS coordinates (i.e. latitude and longitude) in the Measurement Reports which is usually accurate. In some embodiments, it takes advantage of MDT to calibrate the geolocation positioning results including the MNO itself and the competitors. Furthermore, associated these collected competitor networks' RF performance data with the location where these data are collected by the means the implementers preferred and gathered the associated competitor network data and accurate location information at the server, mobile operators can utilize these gathered competitor networks data and compare with their own network to learn about where they have better or worse performance as indication for their own network improvement tasks.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A server, comprising:
    a communication transceiver, transmitting and receiving signals; and
    a processor, coupled to the communication transceiver, and configured for:
        receiving, through the communication transceiver, a first measurement report, wherein the first measurement report is related to a first network performance measurement of a user equipment (UE) with at least one mobile network, and the first measurement report comprises first location information of the UE;
        receiving, through the communication transceiver, a second measurement report, wherein the second measurement report is related to a second network performance measurement of the UE with the at least one mobile network;
        determining second location information of the UE according to a monitoring result obtained from the second measurement report, wherein the monitoring result is related to signal transmission condition of the UE in the at least one mobile network; and
        modifying the second location information according to the first location information, comprising:
            comparing time information between the first location information and the second location information of the UE; and
            using the first location information with matched time or closest time information to modify the second location information.

2. The server according to claim 1, wherein the processor is configured for:
    configuring a network configuration of the first network performance measurement, wherein the network configuration comprises a command to enable satellite positioning operation of the UE, the first location information is obtained based on the satellite positioning operation, and the network configuration is used by a cellular core network entity; and
    transmitting, through the communication transceiver, the network configuration.

3. The server according to claim 2, wherein the first network performance measurement is minimization of drive test (MDT) of third-generation partnership project (3GPP).

4. The server according to claim 2, wherein the network configuration further comprises frequency spectrum information, the frequency spectrum information comprises a plurality of frequency spectrums possessed by at least two mobile networks, the plurality of frequency spectrums are scanned for the second network performance measurement of the UE, and the UE is allowed to register to at least one subscribed mobile network of the at least two mobile networks.

5. The server according to claim 4, wherein the processor is configured for:
    comparing the monitoring results obtained from the first and second measurement reports of the at least one mobile networks at locations corresponding to the first location information and the modified second location information.

6. The server according to claim 1, wherein the processor is configured for:
    correlating signal strengths of the monitoring result of the first measurement report corresponding base stations (BSs) with the first location information, respectively, to generate location reference information; and
    comparing the monitoring result of the second measurement report with the location reference information to determine the second location information of the UE.

7. A positioning method based on mobile network, comprising:
    receiving, by a server, a first measurement report, wherein the first measurement report is related to a first network performance measurement of a user equipment (UE) with at least one mobile network, and the first measurement report comprises first location information of the UE;

receiving, by the server, a second measurement report, wherein the second measurement report is related to a second network performance measurement of the UE with the at least one mobile network;

determining, by the server, second location information of the UE according to a monitoring result obtained from the second measurement report, wherein the monitoring result is related to signal transmission condition of the UE in the at least one mobile network; and modifying, by the server, the second location information according to the first location information, comprising:

comparing time information between the first location information and the second location information of the UE; and using the first location information with matched time or closest time information to modify the second location information.

8. The positioning method based on mobile network according to claim 7, further comprising:

configuring a network configuration of the first network performance measurement, wherein the network configuration comprises a command to enable satellite positioning operation of the UE, the first location information is obtained based on the satellite positioning operation, and the network configuration is used by a cellular core network entity.

9. The positioning method based on mobile network according to claim 8, wherein the first network performance measurement is minimization of drive test (MDT) of third generation partnership project (3GPP).

10. The positioning method based on mobile network according to claim 8, wherein the network configuration further comprises frequency spectrum information, the frequency spectrum information comprises a plurality of frequency spectrums possessed by at least two mobile networks, the plurality of frequency spectrums are scanned for the second network performance measurement of the UE, and the UE is allowed to register to at least one subscribed mobile network of the at least two mobile networks.

11. The positioning method based on mobile network according to claim 10, further comprising:

comparing the monitoring results obtained from the first and second measurement reports of the at least one mobile networks at locations corresponding to the first location information and the modified second location information.

12. The positioning method based on mobile network according to claim 7, further comprising:

correlating signal strengths of the monitoring result of the first measurement report corresponding base stations (BSs) with the first location information, respectively, to generate location reference information, and wherein the step of determining the second location information of the UE according to the monitoring result obtained from the second measurement report comprises:

comparing the monitoring result of the second measurement report with the location reference information.

13. A communication system, comprising:

a user equipment (UE), transmitting a first measurement report, and transmitting a second measurement report, wherein the first measurement report is related to a first network performance measurement of the UE with at least one mobile network, the first measurement report comprises first location information of the UE, and the second measurement report is related to a second network performance measurement of the UE with the at least one mobile network; and a server, determining second location information of the UE according to a monitoring result obtained from the second measurement report, and modifying the second location information according to the first location information, wherein the monitoring result is related to signal transmission condition of the UE in the at least one mobile network, and the server compares time information between the first location information and the second location information of the UE, and uses the first location information with matched time or closest time information to modify the second location information.

14. The communication system according to claim 13, wherein the server configures a network configuration of the first network performance measurement, wherein the network configuration comprises a command to enable satellite positioning operation of the UE, the first location information is obtained based on the satellite positioning operation, and the server transmits the network configuration to a cellular core network entity.

15. The communication system according to claim 14, wherein the first network performance measurement is minimization of drive test (MDT) of third-generation partnership project (3GPP).

16. The communication system according to claim 14, wherein the network configuration further comprises frequency spectrum information, the frequency spectrum information comprises a plurality of frequency spectrums possessed by at least two mobile networks, the plurality of frequency spectrums are scanned for the second network performance measurement of the UE, and the UE is allowed to register to at least one subscribed mobile network of the at least two mobile networks.

17. The communication system according to claim 16, wherein the server compares the monitoring results obtained from the first and second measurement reports of the at least one mobile networks at locations corresponding to the first location information and the modified second location information.

* * * * *